US012732379B2

(12) United States Patent
Jefferies et al.

(10) Patent No.: US 12,732,379 B2
(45) Date of Patent: Sep. 8, 2026

(54) TEMPORARY ENABLEMENT OF FUNCTIONALITY OF A SECURE DEVICE

(71) Applicant: Schneider Electric USA, Inc., Andover, MA (US)

(72) Inventors: Kevin M. Jefferies, Raleigh, NC (US); Gregory Harrison, Andover, MA (US); Yvain Achino, Andover, MA (US)

(73) Assignee: Schneider Electric USA, Inc., Boston, MA (US)

( * ) Notice: Subject to any disclaimer, the term of this patent is extended or adjusted under 35 U.S.C. 154(b) by 168 days.

(21) Appl. No.: 18/410,505

(22) Filed: Jan. 11, 2024

(65) Prior Publication Data

US 2025/0233751 A1 Jul. 17, 2025

(51) Int. Cl.

| | |
|---|---|
| ***H04L 9/32*** | (2006.01) |
| ***H04L 9/00*** | (2022.01) |
| ***H04L 9/30*** | (2006.01) |

(52) U.S. Cl.
CPC ............ *H04L 9/3242* (2013.01); *H04L 9/006* (2013.01); *H04L 9/30* (2013.01); *H04L 9/3247* (2013.01)

(58) Field of Classification Search
CPC ..... H04L 9/006; H04L 9/0643; H04L 9/3242; H04L 9/3247; H04L 9/3271; H04L 9/30; H04L 63/0853; H04L 63/105
See application file for complete search history.

(56) References Cited

U.S. PATENT DOCUMENTS

| | | | | |
|---|---|---|---|---|
| 10,114,941 | B2 * | 10/2018 | Pedersen | G06F 21/72 |
| 10,771,442 | B2 * | 9/2020 | Sadhasivan | H04L 63/06 |
| 11,373,172 | B1 * | 6/2022 | Griffin | H04L 9/0897 |
| 2003/0221109 | A1 * | 11/2003 | Boyer | H04L 9/3242 713/176 |

(Continued)

FOREIGN PATENT DOCUMENTS

| | | | |
|---|---|---|---|
| CA | 2869404 | A1 | 5/2015 |
| CN | 107978047 | A | 5/2018 |
| EP | 4224792 | A1 | 8/2023 |

OTHER PUBLICATIONS

Ylonen T: RFC 4253—The Secure Shell In: "RFC 4253—The Secure Shell (SSH) Transport Layer Protocol", Jan. 31, 2006 (Jan. 31, 2006), XP055798965, pp. 1-32, Retrieved from the Internet: URL: https://tools.ietf.org/html/rfc4253#section-7.2.

(Continued)

*Primary Examiner* — Eric W Shepperd
(74) *Attorney, Agent, or Firm* — Kinney & Lange, P.A.

(57) ABSTRACT

A method is provided for temporarily enabling functionality of a secure device. The method includes storing public keys for respective trusted devices of at least one trusted device, storing device-unique data that is unique for the secure device, generating a unique hashed-based message authentication code (HMAC) key, computing, based on the HMAC key and the device-unique data, a unique HMAC, transmitting the HMAC to a trusted device of the at least one trusted device, receiving a signed HMAC from the trusted device, wherein the signed HMAC is the HMAC as signed by the trusted device using a private key of the trusted device, decrypting the signed HMAC using the public key for the trusted device, comparing the decrypted signed HMAC to the HMAC, and enabling functionality of the secure device based on a result of the comparison.

20 Claims, 4 Drawing Sheets

(56) References Cited

U.S. PATENT DOCUMENTS

| | | | | |
|---|---|---|---|---|
| 2011/0252466 | A1* | 10/2011 | Le Saint | G06F 21/34 726/9 |
| 2016/0323294 | A1* | 11/2016 | Fahrny | H04L 63/105 |
| 2017/0288867 | A1* | 10/2017 | Collier | G06F 21/602 |
| 2018/0241550 | A1* | 8/2018 | Hirschberg | H04L 9/0643 |
| 2020/0186358 | A1* | 6/2020 | Capola | H04L 9/3228 |
| 2020/0387614 | A1* | 12/2020 | Harrison | H04L 9/0866 |
| 2021/0006409 | A1* | 1/2021 | Jefferies | H04L 9/3247 |
| 2021/0103662 | A1* | 4/2021 | Ashok | G06F 8/654 |
| 2021/0243030 | A1* | 8/2021 | Robison | H04L 9/0877 |
| 2021/0326459 | A1* | 10/2021 | Chivukula | H04L 9/3268 |
| 2022/0224542 | A1* | 7/2022 | Sharma | H04L 61/4511 |
| 2022/0385477 | A1* | 12/2022 | Kravitz | H04L 9/3247 |
| 2023/0216855 | A1* | 7/2023 | Potapov | H04L 63/0281 726/27 |
| 2023/0370334 | A1* | 11/2023 | Mannengal | H04L 43/04 |

OTHER PUBLICATIONS

Extended European Search Report for European Patent Application No. EP24222930.0, dated Jun. 4, 2025.
Infineon Optiga Trust Mv3 Collection, https://www.infineon.com/part/OPTIGA-TRUST-M-SLS32AIA, 10 pages.
Mbed TLS Cryptographic Library, https://www.trustedfirmware.org/projects/mbed-tls/, 4 pages.
NIST Federal Infomration Processing Standards 198-1.
NIST Federal Information Processing Standards 186-5.
NIST Hardware Security Module Definition, https://csrc.nist.gov/glossary/term/Hardware_Security_Module_HSM, 2 pages.
NXP EdgeLock SE051 Collection, NXP EdgeLock SE051 Collection, 11 pages.
OpenSSL Cryptographic Library, https://openssl-library.org, 2 pages.

* cited by examiner

TEMPORARY ENABLEMENT OF FUNCTIONALITY OF A SECURE DEVICE

TECHNICAL FIELD

The disclosure relates to secure device management, and in particular to enablement of functionality of a secure device, including a secure industrial device.

BACKGROUND

Secure processing devices can be locked. Different levels of access to a secured processing device can be locked as well. Unlocking the device or a particular level of access can require a cryptographic key and/or a credential, such as a username, password, and/or biometric factor. The device can be hard coded with a credential or can use a reusable cryptographic key to unlock the device or a level of access. However, storing the credential by the device or using the reusable cryptographic key can be prohibited by certain security policies, and/or can cause the device to be vulnerable to a security breach.

There is a need for a system and method for allowing a secured processing device or a level of access to the secured processing device to be locked and unlocked without the device storing credentials and without using a reusable cryptographic key. This disclosure provides a solution for this need.

SUMMARY

The purpose and advantages of the illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with a purpose of the illustrated embodiments, in one aspect, a method for temporarily enabling functionality of a secure device is provided. The method includes storing public keys for respective trusted devices of at least one trusted device, storing device-unique data that is unique for the secure device, generating a unique hashed-based message authentication code (HMAC) key, computing, based on the HMAC key and the device-unique data, a unique HMAC, transmitting the HMAC to a trusted device of the at least one trusted device, receiving a signed HMAC from the trusted device, wherein the signed HMAC is the HMAC as signed by the trusted device using a private key of the trusted device, decrypting the signed HMAC using the public key for the trusted device, comparing the decrypted signed HMAC to the HMAC, and enabling functionality of the secure device based on a result of the comparison.

In one or more embodiments, the method can further include storing the HMAC after it is computed and retrieving the HMAC before it is compared.

In one or more embodiments, the HMAC key can disappear for the secure device after being generated and used for computing the HMAC, and the HMAC can be generated a single time.

In one or more embodiments, the method can further include storing the HMAC key after it is generated, and before the HMAC is compared, computing the HMAC a second time using the stored HMAC key and the stored device-unique data before it is compared.

In one or more embodiments, the HMAC can disappear for the secure device after being computed the first time and transmitted and after being computed the second time and compared.

In one or more embodiments, the functionality can be enabled temporarily and can expire based on an enablement condition.

In one or more embodiments, the enablement condition can be a function of a predetermined time period, receipt of a predetermined number of enablement requests to enable the functionality of the secure device, a predetermined number of power cycles of the secure device, a predetermined number of times the functionality is enabled or used, and/or a predetermined number of times of receiving the signed HMAC from the at least one trusted device.

In one or more embodiments, the enablement condition can be configurable.

In one or more embodiments, the method can further include deleting the HMAC key responsive to an HMAC key expiration condition and generating a new unique HMAC key.

In one or more embodiments, the expiration condition can be a function of a predetermined time period, receipt of a predetermined number of enablement requests to enable the functionality of the secure device, a predetermined number of power cycles of the secure device, a predetermined number of times the functionality is enabled or used, and/or a predetermined number of times of receiving the signed HMAC from the at least one trusted device.

In one or more embodiments, the expiration condition can be configurable.

In one or more embodiments, before enabling the functionality, the secure device can operate with a first level of functionality, and after enabling the functionality, the secure device can operate with a second level of functionality that is different from the first level of functionality.

In one or more embodiments, the second level of functionality can provide additional or fewer functions relative to the first level of functionality, and only one of the first and second levels of functionality may allow the secure device to perform one or more of diagnostics associated with the secure device, in-depth troubleshooting associated with the secure device, in-depth testing of the secure device, changing protected settings of the secure device, recovering the secure device from a reduced state of functionality to a normal state of functionality, performing a firmware downgrade or upgrade, and restoring the secure device from a disabled state to an enabled state.

In one or more embodiments, the secure device can be an industrial device that is configured to operate in an industrial environment.

In one or more embodiments, the secure device can be an air-gapped device.

In one or more embodiments, the device-unique data can be programmed or set in the secure device when secure device is manufactured and can be stored by the secure device in a trusted non-volatile location.

In one or more embodiments, the method can further include computing the HMAC a second time before comparing the decrypted signed HMAC to the computed HMAC, obviating a need to store the computed HMAC.

In accordance with another aspect of the disclosure. A secure device is provided, which includes a memory configured to store programmable instructions and at least one processing device in communication with the memory, wherein the at least one processing device, upon execution of the programmable instructions is configured to perform the disclosed method.

In accordance with still a further aspect of the disclosure, a non-transitory computer readable storage medium and one or more computer programs embedded therein is provided, which when executed by a computer system, cause the computer system to perform the disclosed method.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

A more detailed description of the disclosure, briefly summarized above, may be had by reference to various embodiments, some of which are illustrated in the appended drawings. While the appended drawings illustrate select embodiments of this disclosure, these drawings are not to be considered limiting of its scope, for the disclosure may admit to other equally effective embodiments.

Identical reference numerals have been used, where possible, to designate identical elements that are common to the figures. However, elements disclosed in one embodiment may be beneficially utilized on other embodiments without specific recitation.

DETAILED DESCRIPTION

Figure 1:
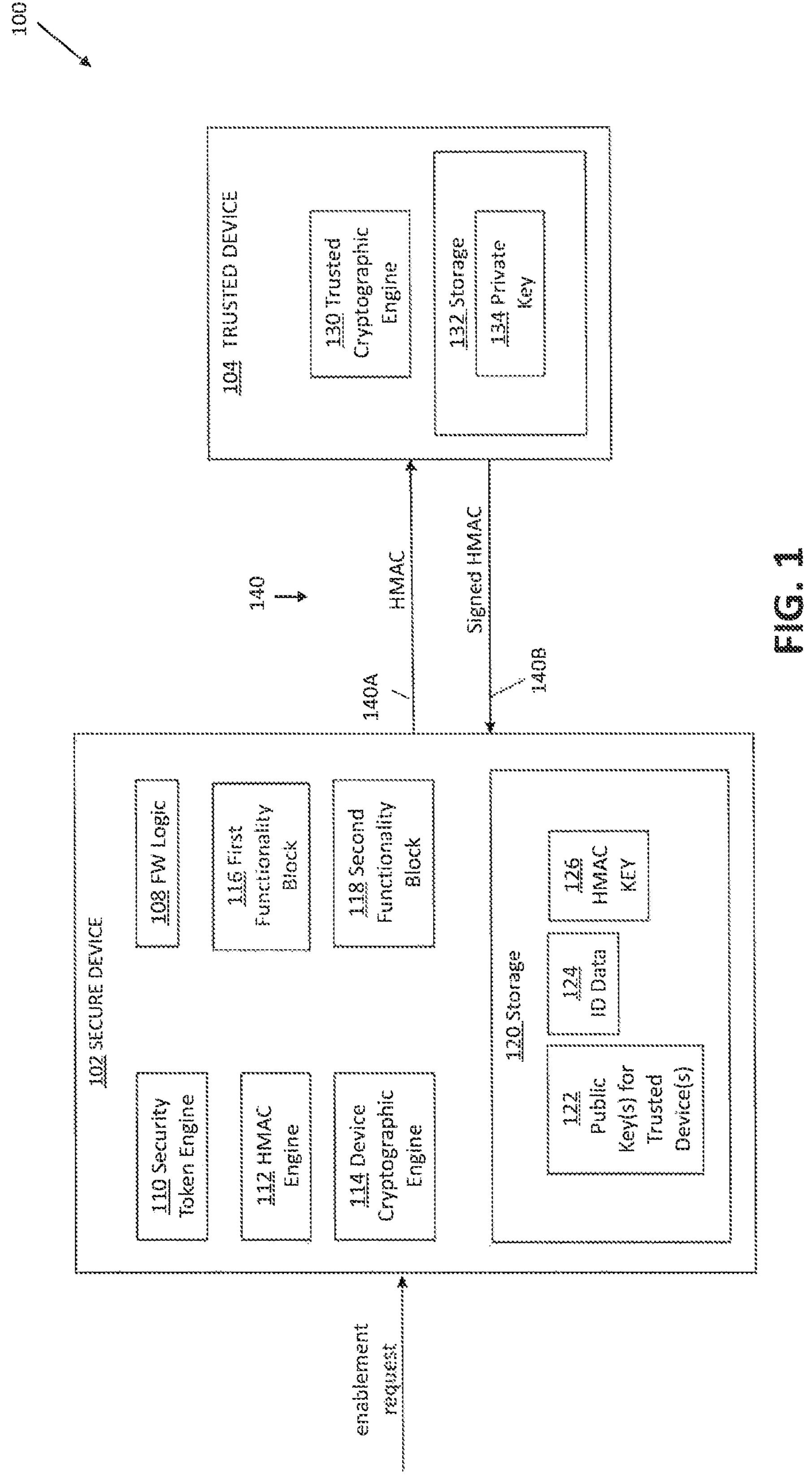
FIG. 1 is a block diagram illustrating an example system for management of a secure device using a trusted device, in accordance with embodiments of the disclosure.

Reference will now be made to the drawings wherein like reference numerals identify similar structural features or aspects of the subject disclosure. For purposes of explanation and illustration, and not limitation, a block diagram of an exemplary embodiment of a device management system in a first scenario in accordance with the disclosure is shown in FIG. 1 and is designated generally by reference character 100. Other embodiments of the device management system in accordance with the disclosure, or aspects thereof, are provided in FIGS. 2-4 as will be described.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth. It is to be appreciated the embodiments of this disclosure as discussed below are implemented using a software algorithm, program, or code that can reside on a computer useable medium for enabling execution on a machine having a computer processor. The machine can include memory storage configured to provide output from execution of the computer algorithm or program.

As used herein, the term "software" is meant to be synonymous with any logic, code, or program that can be executed by a processor of a host computer, regardless of whether the implementation is in hardware, firmware or as a software computer product available on a memory storage device or for download from a remote machine. The embodiments described herein include such software to implement the equations, relationships, and algorithms described above. One skilled in the art will appreciate further features and advantages of the disclosure based on the above-described embodiments. Accordingly, the disclosure is not to be limited by what has been particularly shown and described, except as indicated by the appended claims.

With reference to FIG. 1, a secure device 102 and a trusted device 104 are provided. Both, secure device 102 and trusted device 104 are computing devices having memories that store programmable instructions and processing units configured to execute the programmable instructions, causing the performance of the disclosed method by the corresponding device of secure device 102 and an example trusted device 104 of one or more possible trusted devices. Secure device 102 and trusted device 104 communicate via communication channels 140. Although a single bi-directional communication channel can be used for both directions, communication channels 140A and 140B are shown to illustrate data sent in each direction.

Secure device 102 includes firmware logic 108, a security token engine 110, a hash-based message authentication code (HMAC) engine 112, a device cryptographic engine 114, a first functionality block 116, a second functionality block 118, and storage 120. Storage 120 stores a public key for the trusted device(s) 122 and identification (ID) data that identifies secure device 102, and further temporarily stores an HMAC key 126 and an HMAC. Security token engine 110, HMAC engine 112, device cryptographic engine 114, and storage 120 can each use hardware, firmware, and/or software components.

Security token engine 110 is configured to generate HMAC key 126, such as by using a National Institute of Standards and Technology™ (NIST™) Special Publication 800-90B compliant true random number generator (TRNG) implemented in hardware or a NIST SP 800-90A compliant deterministic random number generator (DRNG), or the equivalent, implemented in either software or hardware.

Examples of software-based DRNG solutions are included in (but are not limited to) the mbedTLS™ cryptographic library and the OpenSSL™ cryptographic library.

Examples of hardware-based TRNG and DRNG solutions are included in (but are not limited to) Infineon™ Optiga™ Trust Mv3's collection of solutions and NXP™ EdgeLock™ SE051's collection of solutions.

In an example embodiment, a hardware solution, such as the Infineon Optiga Trust Mv3 microchip is utilized. This particular microchip provides an application programming interface (API) which allows a user to "request" generation of an HMAC key. The microchip then utilizes its internal TRNG to generate a 128 bit random value and then the microchip stores the random value internally in a dedicated slot (or location). Any time thereafter, when the user wants an HMAC to be generated, the user utilizes another API requesting the microchip to generate an HMAC. The microchip then generates the HMAC for the data provided by the user utilizing the earlier generated/stored/protected HMAC key. This approach taken by Infineon ensures this HMAC key is never disclosed outside of the microchip, thereby preventing inadvertent disclosure and compromise.

HMAC engine 112 is configured to use a keyed HMAC algorithm, such as the algorithm defined in the NIST Federal Information Processing Standards (FIPS) 198-1, or the equivalent. Per FIPS 198-1, the HMAC algorithm can be implemented in software, firmware, hardware or any combination thereof. Examples of software-based HMAC solutions are included in (but are not limited to) the mbedTLS cryptographic library and the OpenSSL cryptographic library. Examples of hardware-based HMAC solutions are included in (but are not limited to) the Infineon Optiga Trust Mv3's collection of solutions and the NXP EdgeLock SE051's collection of solutions.

Cryptographic engine 114 is configured to use asymmetric cryptographic algorithms to decrypt messages received from trusted device 104 using trusted device 104's public key. The use of asymmetric cryptographic algorithms to generate and validate digital signatures is defined and specified in the NIST FIPS Digital Signature Standard (DSS) FIPS 186-5, or the equivalent. Per FIPS 186-5, digital signature algorithms may be implemented in software, firmware, hardware or any combination thereof.

The FIPS 186-5 defined digital signature algorithms include the RSA Digital Signature Algorithm and the Elliptic Curve Digital Signature Algorithm (ECDSA). Software and/or firmware based Digital Signature Algorithm implementations can be found in (but are not limited to) the mbedTLS cryptographic library and the OpenSSL cryptographic library.

Hardware based Digital Signature Algorithm solutions are included in (but are not limited to) the Infineon Optiga Trust Mv3's collection of solutions and the NXP EdgeLock SE051's collection of solutions.

First functionality block 116 and second functionality block 118 are implemented in firmware. Depending on which of functionality blocks 116 and 118 are enabled, secure device 102 can have access to neither, both, or either one of first functionality block 116 or second functionality block 118. Storage 120 can include volatile and nonvolatile storage. Public key 122 and ID data 124 are stored in nonvolatile storage. Public key 122 is a public cryptographic key for trusted device 104. If there is more than one trusted device 104 that is trusted for device 102, a public key 122 is stored for each of the trusted devices 104.

ID data 124 includes data that is unique for device 102. This can be, for example, data that was generated and stored by a manufacturer of device 102, such as a serial number, model and production date, or the like. Device ID data 124 can include any combination of the following data, as long as the result is a static, unique value:

- device commercial reference number (e.g., when combined with device or microprocessor serial number(s)) (which is typically programmed in manufacturing)
- device serial number (which is typically programmed in manufacturing)
- microprocessor serial number(s) (which is typically set by microprocessor manufacturer(s))
- production date (e.g., when combined with device or microprocessor serial number(s)) (which is programmed in manufacturing)
- hardware revision (e.g., when combined with device or microprocessor serial number(s)) (which is programmed in manufacturing)

Storage by device 102 is configured to meet the following requirements. Public key 122 is stored in a trusted non-volatile location where key integrity can be guaranteed. This can be in a secure element, such as the Infineon Optiga Trust Mv3 or the NXP EdgeLock SE051. Another example of a trusted non-volatile location is or in an internal non-volatile storage location where write access has been disabled after the public key 122 is stored there. ID data 124 can be calculated on-demand as needed from the various defined static values. In certain embodiments, ID data 124 is calculated once and is then stored. When stored, ID data 124 should be stored in a trusted non-volatile location where the ID data value integrity can be guaranteed. If stored in an internal non-volatile storage location, write access is disabled after the ID data 124 is stored there.

HMAC key 126 is generated by a secure element and, if stored, is stored by a secure element, such as the Infineon Optiga Trust Mv3 or the NXP EdgeLock SE051. While HMAC key 126 can be generated by software, such as mBedTLS or OpenSSL and stored in a non-volatile memory location, doing so is much less secure and should be avoided. If stored in an internal non-volatile storage location, write access is controlled and/or protected after the HMAC key 126 is stored there.

HMAC: Once calculated, this value can be shared externally. The HMAC is a public value, so it does not need to be protected against disclosure. If stored, it is important that the HMAC be stored in such a way that ensures integrity.

HMAC key 126 is a random and secure key generated by security token engine 110. HMAC key is temporary and expires based on a particular condition. After expiration, a new HMAC key 126 can be generated. Each HMAC key 126 is generated using a randomization function. Device 102 stores HMAC key 126 locally and securely in storage 120. A user of device 102 is unaware of HMAC key 126 and does not have access to HMAC key 126. HMAC key 126 is only accessible by security token engine 110 and HMAC engine 112.

The HMAC is generated by HMAC engine 112 using an HMAC algorithm that enables authentication and verification of data for correctness and authenticity using shared secrets. The HMAC is generated per the definition in FIPS 198-1. HMAC engine 112 applies the HMAC algorithm to ID data 124 and HMAC key 126 to generate the HMAC.

Firmware logic 108 is implemented in firmware and can affect operations performed by security token engine 110, HMAC engine 112, device cryptographic engine 114, first functionality block 116, and/or second functionality block 118, such as an order of operations and which of first functionality block 116 and/or second functionality block 118 are operable.

Device cryptographic engine 114 uses a cryptographic algorithm that is compatible with a cryptographic algorithm used by trusted device 104. Device cryptographic engine 114 is configured to select an appropriate public key from public key(s) for trusted device(s) 122 when receiving a signed HMAC from trusted device 104.

Trusted device 104 includes a trusted cryptographic engine 130 and storage 132. Storage 132 stores a private key 134 in nonvolatile storage. Private key 134 must be stored in a Hardware Security Module (HSM) or the equivalent.

Trusted device 104 receives the computed HMAC from secure device 102 via communication channel 140A. Trusted cryptographic engine 130 uses an asymmetric cryptographic algorithm to sign the HMAC using private key 134. The signed HMAC can only be decrypted using trusted device 104's public key and a cryptographic algorithm that is compatible with the cryptographic algorithm used by trusted cryptographic engine 130. Trusted device 104's public key is stored by secure device 102 in storage 120 with public key(s) for trusted device(s) 122. The signed HMAC is submitted from trusted device 104 to secure device 102 via communication channel 140B.

Secure device 102 receives the signed HMAC via communication channel 140B, and device cryptographic engine 114 uses the appropriate public key of public key(s) for trusted device(s) 122 to decrypt the signed HMAC. A determination is made whether the decrypted signed HMAC matches the computed HMAC. This comparison can be performed in hardware by device cryptographic engine 114 or in firmware by firmware logic 108. A result of the comparison is used to determine which functionality is enabled, such as which of first functionality block 116 and/or second functionality block 118 is enabled to operate. Firmware logic 108 can control which functionality is enabled.

In one or more embodiments, the HMAC is computed a first time before transmitting it to trusted device 104, and is computed a second time before comparing the computed HMAC to the signed HMAC. In this way, the computed HMAC would never be stored by secure device 102. This ensures that each time secure device 102 compares a received signed HMAC to a computed HMAC, the computed HMAC is computed using most current HMAC key.

In this way, a security feature is provided. HMAC key 126 can be deleted and replaced by a new HMAC key 126 (New HMAC key 126). Replacement of HMAC key 126 with the new HMAC key can be performed after sending the computed HMAC to trusted device 104. A new HMAC (New HMAC) can be generated by secure device 102 and provided to trusted device 104. Trusted device 104 can sign the initial HMAC and output a signed HMAC (which is now obsolete), and can also sign the New HMAC and output a new signed HMAC (New signed HMAC). When secure device 102 receives the signed HMAC, it computes new HMAC, and the comparison results in a mismatch, which does not allow the second functionality to be enabled. When secure device 102 receives the New signed HMAC, it computes new HMAC, and the comparison results in a match, which allows the second functionality to be enabled. Thus, replacement of HMAC key 126 with a new HMAC key 126 provides a security feature that can prevent a malicious imposter device from using an old version of a signed HMAC to enable the second functionality of secure device 102. Causing expiration of HMAC key 126 by deleting it and replacing it with a new HMAC key 126 can be triggered by different expiration conditions.

The process of generating the HMAC and/or sending the HMAC to one of the trusted devices 104 can be triggered by an enablement request submitted to secure device 102 by a user or an external processing device. The enablement request is a request for a new function of secure device 102 to be enabled. Prior to receiving the enablement request, secure device 102 can have the ability to perform a first functionality provided by first functionality block 116, but does not have the ability to perform a second functionality (e.g., the new function) provided by second functionality block 118. The first and second functionalities can be different from one another. The first functionality can be reduced relative to the second functionality, increased relative to the second functionality, or just different. The reduced functionality can be minimal or render secure device 102 inoperable other than having the functionality provided by firmware logic 108, security token engine 110, HMAC engine 112, and device cryptographic engine 114.

Some examples of the first and second functionalities, without limitation to the examples provided, include diagnostics associated with secure device 102 (which can refer to diagnostics of secure device 102 or diagnostics of a different device by secure device 102), in-depth testing and/or troubleshooting associated with secure device 102 (which can refer to testing and/or troubleshooting of secure device 102 or testing and/or troubleshooting of a different device by secure device 102), changing protected settings of secure device 102 of another device by secure device 102, a reduced state of functionality, a normal state of functionality, performance of a firmware downgrade or upgrade, functionality of an disabled state, and functionality of an enabled state.

For example, and without limitation to the examples provided, a change from the first functionality to the second functionality could enable an ability to perform diagnostics, testing, or troubleshooting that were not previously available; recover from a reduced state of functionality to a normal state of functionality; restore operability from a disabled state to an enabled state; or upgrade or downgrade firmware.

The change in functionality can be temporary, which can cause the second functionality to be disabled and/or a return to enablement of the first functionality without enablement of the second functionality. This would cause secure device 102 to lose the second functionality and/or to revert back to having the first functionality.

In one or more embodiments, enablement of the second functionality is temporary. For example, and without limitation, the second functionality can be enabled temporarily based on a predetermined enablement condition, such as (without limitation) passage of a predetermined time period, receipt of a predetermined number of enablement requests, occurrence of a predetermined number of power cycles of secure device 102, use of the functionality for a predetermined number of times, or receipt of the signed HMAC from one of trusted devices 104 a predetermined number of times. The enablement condition can be user configurable.

In one or more embodiments, the enablement request is effective on a temporary basis, such as by causing HMAC key 126 to be expired and to be replaced by a new HMAC key. Expiration conditions that can cause an HMAC key to expire can include, without limitation to the examples provided, passage of a predetermined time period, receipt of a predetermined number of enablement requests, occurrence of a predetermined number of power cycles of secure device 102, use of the functionality for a predetermined number of times, or receipt of the signed HMAC from one of trusted devices 104 a predetermined number of times. The HMAC key expiration condition can be user configurable.

Communication channels 140 (140A and 140B) can be wired or wireless communication channels.

In one or more embodiments, secure device 102 can be an industrial device that is configured to operate in an industrial environment. For example, secure device 102 can be a controller (e.g., a PLC, an edge device, a microcontroller, etc.) that controls a field device, such as a sensor, actuator, alarm, etc. In one or more embodiments, secure device 102 can be a field device. Source device 102 can be required based on industrial standards to operate within an intranet as an air-gapped device. An air-gapped device is buffered or cut-off from being coupled to an external network that is external to the intranet. The external network can be, for example, a different intranet or a public network, such as the Internet. An air gap can be implemented, for example, by a firewall on each side of the air gap. The air gap can be permanent or temporary, such as being established based on a condition or on demand.

Secure device can be a supervisory control device or other computing device, such as a server, mobile device, etc. in an industrial setting. Secure device 102 can be included in an operational technology (OT) network.

In one or more embodiments, secure device 102 can be part of an informational technology (IT) network.

Communication channels 140 can be restricted to wired communication channels, such as in an industrial setting. Communication channels 140 can comply with air gap requirements. For example, communication channels 140 can be buffered or cut-off from being coupled to an external network that is external to an intranet within which secure device 102 operates.

Figure 2:
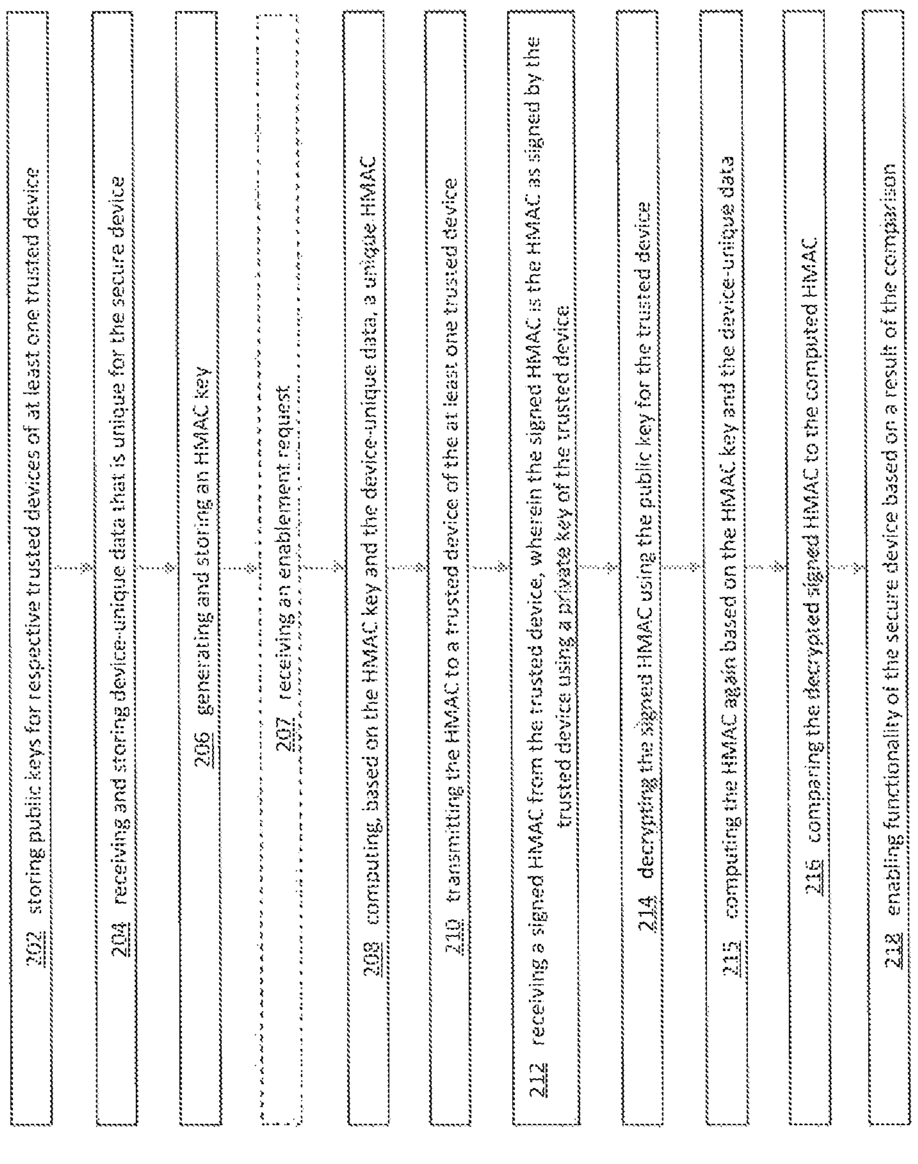
FIG. 2 is a flowchart showing an example method for managing a secure device using a trusted device responsive to receiving enablement requests in accordance with embodiments of the disclosure.
Figure 3:
FIG. 3 is a flowchart showing an alternative example method for managing a secure device using a trusted device responsive to receiving enablement requests, in accordance with embodiments of the disclosure.

With reference now to FIGS. 2 and 3, shown are flowcharts demonstrating implementation of the various exemplary embodiments. It is noted that the order of operations shown in FIGS. 2 and 3 is not required, so in principle, the various operations may be performed out of the illustrated order. Also, certain operations may be skipped, different operations may be added or substituted, some operations may be performed in parallel instead of strictly sequentially, or selected operations or groups of operations may be performed in a separate application following the embodiments described herein.

FIGS. 2 and 3 are performed by a secure device, such as secure device 102, shown in FIG. 1. With reference to FIG. 2, a method performed by the secure device is shown in accordance with one or more embodiments. At block 202 a public key for one or more respective trusted devices of at least one trusted device are stored. Public key(s) are usually introduced, programmed, and/or stored during the manufacturing process and do not change during the life of the product. With that said, it is possible for public keys to be added at any time as long as the functionality has been implemented. For example, and without limitation, a new public key can be deployed as part of a firmware upgrade, such as by an authenticated administrator having appropriate privileges to upload additional/new public keys through a defined interface.

At block 204, device-unique data that is unique for the secure device, such as ID data 124 shown in FIG. 1, is received and stored in a storage receptacle of the secure device, e.g., in in storage 120 shown in FIG. 1. Storage of the device-unique data can be secure and only accessible to authorized processes, such as HMAC engine 112 shown in FIG. 1.

At block 206, an HMAC key, such as HMAC key 126 shown in FIG. 1, is generated using a secure randomization algorithm that outputs a random number as HMAC key. The randomization algorithm can be executed by a security token engine hardware device, such as security token engine 110 shown in FIG. 1. Once the HMAC key is generated, it is securely stored in a fashion such that it can only be accessed for generating an HMAC. For example, HMAC key may only be accessible by the security token engine and a hardware engine that generates HMACs, such as HMAC engine 112 shown in FIG. 1.

At block 207, an enablement request is received. The enablement request can be submitted by a user or another processing device. A user or processing device can submit the enablement request when it is desired to enable a functionality of the secure device that is not presently enabled. Block 207 is shown in dotted lines to indicate that it is a trigger to cause block 208 to be performed in certain embodiments.

At block 208, a unique HMAC is computed by applying an HMAC algorithm to the device-unique data and the HMAC key. The HMAC algorithm can be applied by an HMAC engine, such as HMAC engine 112 shown in FIG. 1. The HMAC algorithm enables authentication and verification of data for correctness and authenticity using shared secrets.

At block 210, the HMAC is transmitted to a trusted device, such as trusted device shown in FIG. 1. The secure device and the trusted device can be pre-registered with one another, such that the secure device stores a public key for the trusted device and the trusted device stores its own private key. The public and private keys are complementary in order to be used with asymmetric cryptography techniques. The secure device can have public keys for more than one trusted device and can use the different trusted devices and their corresponding public keys for different respective situations.

In one or more embodiments, the HMAC is not stored by the secure device once it is transmitted to the trusted device, such that the HMAC disappears for the secure device after being computed at block 210, meaning it is no longer stored by the secure device in short term or long term memory.

At block 212, the secure device receives a signed HMAC from the trusted device. The signed HMAC is the HMAC that the secure device sent to the trusted device and was then signed by the trusted device using its private key.

At block 214, the secure device decrypts the signed HMAC using the public key for the trusted device. The public key used to decrypt the signed HMAC must be complementary to the private key that was used by the trusted device to sign the HMAC.

At block 215, the secure device computes the HMAC a second time based on the HMAC key and the device-unique data. At block 216, the secure device compares the decrypted signed HMAC to the HMAC that was computed the second time. The HMAC that was computed the second time can disappear for the secure device after being compared.

Typically block 215 is performed and this data is sent to the digital signature algorithm along with a signature that is to be verified and the associated public key. The digital signature algorithm performs its processing at blocks 214 and 216 and returns a SUCCESS/FAILURE result.

At block 218, the secure device enables a functionality of the secure device (e.g., per the enablement request received at block 207) based on a result of the comparison. The functionality of the secure device can be only enabled if the comparison indicates that the decrypted signed HMAC matches the computed HMAC. However, if the decrypted signed HMAC and the computed HMAC are determined by the comparison to not match each other, the functionality is not enabled.

When receiving a second enablement request, the blocks shown in FIG. 2 are performed again to process the second enablement request using a new HMAC key and generating a new unique HMAC. The second enablement request can be for enablement of the same functionality that was requested by the first enablement request or for enablement of a different functionality than was requested by the first enablement request. At block 207, the secure device receives the second enablement request. At block 208, the secure device computes and stores the new HMAC key. The new HMAC is computed based on the new HMAC key and the device-unique data. At block 210, the new HMAC is transmitted to the trusted device. The trusted device used for processing the second enablement request can be the same as or different from the trusted device that was used to process the previous enablement request.

At block 212, the secure device receives a new signed HMAC from the trusted device, wherein the new signed HMAC is the new HMAC as signed by the trusted device using a private key of the trusted device to which the new HMAC was submitted.

At block 214, the secure device decrypts the new signed HMAC using the public key for the trusted device from which the new signed HMAC was received.

At block 215, the secure device computes the new HMAC again based on the new HMAC key and the device-unique data. Block 215 is performed in accordance with embodiments in which the new HMAC is not stored once it is transmitted to the trusted device.

At block 216, the secure device compares the decrypted signed new HMAC to the computed new HMAC.

At block 218, the secure device enables a functionality of the secure device (e.g., per the new enablement request received at block 207) based on a result of the comparison. The functionality of the secure device can be only enabled if the comparison indicates that the decrypted signed new HMAC matches the computed new HMAC. However, if the decrypted signed new HMAC and the computed new HMAC are determined by the comparison to not match each other, the functionality is not enabled. In the preceding, reference is made to various embodiments.

With reference to FIG. 3, an alternative method performed by the secure device is shown in accordance with one or more embodiments. Blocks 202, 204, 207, 210, 212, 214, and 216 are performed similarly to the corresponding blocks shown in FIG. 2 and are not described briefly with respect to FIG. 3.

At block 202 a public key for one or more respective trusted devices of at least one trusted device are stored. At block 204, device-unique data that is unique for the secure device, such as ID data 124 shown in FIG. 1, is received and stored in a storage receptacle of the secure device, e.g., in in storage 120 shown in FIG. 1.

At block 207, an enablement request is received. At block 306, an HMAC key, such as HMAC key 126 shown in FIG. 1, is generated using a secure randomization algorithm that outputs a random number as HMAC key, however (unlike block 206 of FIG. 2), HMAC key is not stored, such that the HMAC key disappears for the secure device after being generated and used for computing the HMAC. When the HMAC key disappears, the HMAC is generated a single time.

At block 308, a unique HMAC is computed by applying an HMAC algorithm to the device-unique data and the HMAC key. The unique HMAC is further stored (unlike block 208 in FIG. 2) for future use.

At block 210, the HMAC is transmitted to a trusted device, such as trusted device shown in FIG. 1. At block 212, the secure device receives a signed HMAC from the trusted device. At block 214, the secure device decrypts the signed HMAC using the public key for the trusted device.

At block 315, the secure device retrieves the stored HMAC that was previously computed and stored at block 308. At block 316, the secure device compares the decrypted signed HMAC to the retrieved HMAC. At block 218, the secure device enables a functionality of the secure device (e.g., per the enablement request received at block 207) based on a result of the comparison.

When receiving a second enablement request in accordance with this alternative example method, the blocks shown in FIG. 3 are performed again to process the second enablement request using a new HMAC key and generating a new unique HMAC. At block 207, the second enablement request is received. At block 306, a new HMAC key is generated using the secure randomization algorithm. This new HMAC key is not stored.

At block 308, a new unique HMAC is computed by applying the HMAC algorithm to the device-unique data and the new HMAC key. The new unique HMAC is stored for future use.

At block 210, the new HMAC is transmitted to the trusted device. The trusted device used for processing the second enablement request can be the same as or different from the trusted device that was used to process the previous enablement request.

At block 212, the secure device receives a new signed HMAC from the trusted device, wherein the new signed HMAC is the new HMAC as signed by the trusted device using a private key of the trusted device to which the new HMAC was submitted.

At block 214, the secure device decrypts the new signed HMAC using the public key for the trusted device from which the new signed HMAC was received. At block 315, the secure device retrieves the new HMAC that was stored at block 308. At block 316, the secure device compares the decrypted signed new HMAC to the retrieved new HMAC.

At block 218, the secure device enables a functionality of the secure device (e.g., per the new enablement request received at block 207) based on a result of the comparison.

The various embodiments disclosed herein may be implemented as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer-readable medium(s) having computer-readable program code embodied thereon.

Any combination of one or more computer-readable medium(s) may be utilized. The computer-readable medium may be a non-transitory computer-readable medium. A non-transitory computer-readable medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer-readable medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Program code embodied on a computer-readable medium may be transmitted using any appropriate medium, including but not limited to wireless, wireline, optical fiber cable, radio frequency (RF), etc., or any suitable combination of the foregoing.

Computer program code for carrying out operations for aspects of the present disclosure may be written in any combination of one or more programming languages. Moreover, such computer program code can execute using a single computer system or by multiple computer systems communicating with one another (e.g., using a local area network (LAN), wide area network (WAN), the Internet, etc.). While various features in the preceding are described with reference to flowchart illustrations and/or block diagrams, a person of ordinary skill in the art will understand that each block of the flowchart illustrations and/or block diagrams, as well as combinations of blocks in the flowchart illustrations and/or block diagrams, can be implemented by computer logic (e.g., computer program instructions, hardware logic, a combination of the two, etc.). Generally, computer program instructions may be provided to a processor(s) of a general-purpose computer, special-purpose computer, or other programmable data processing apparatus. Moreover, the execution of such computer program instructions using the processor(s) produces a machine that can carry out a function(s) or act(s) specified in the flowchart and/or block diagram block or blocks.

The flowchart and block diagrams in the Figures illustrate the architecture, functionality and/or operation of possible implementations of various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 4:
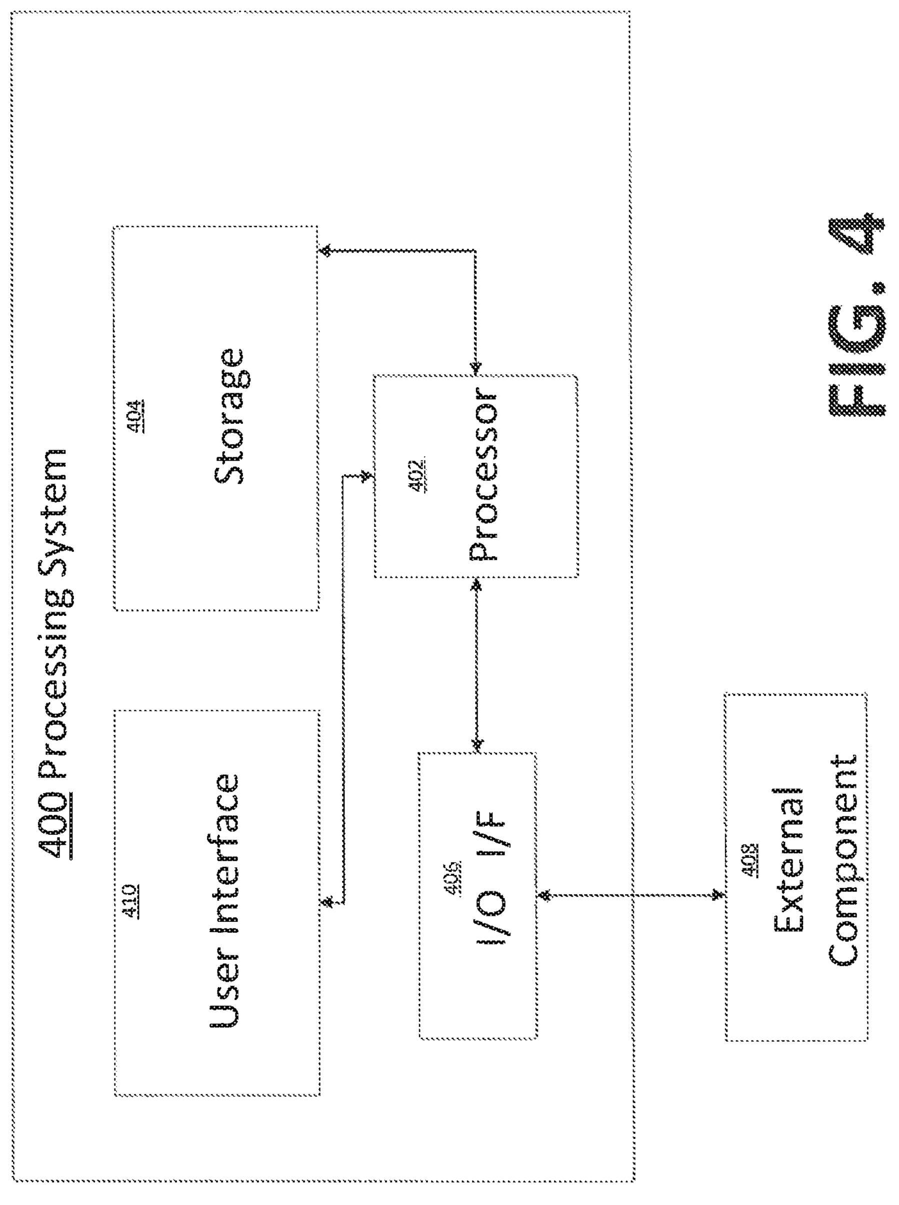
FIG. 4 is a block diagram of an exemplary processing system that could be used to manage a secure device using a trusted device, in accordance with embodiments of the disclosure.

Any combination of one or more computer-readable medium(s) may be utilized. With reference to FIG. 4, a block diagram of an example computer system 400 is shown, which provides an example configuration of secure device (102) shown in FIG. 1, which can be embodied, separately or in any combination, in one or more computer systems. One such computer system 400 is illustrated in FIG. 4. In various embodiments, computer system 400 may be a server, a mainframe computer system, a workstation, a network computer, a desktop computer, a laptop, a handheld computer, an embedded system, or the like, and/or include one or more of a processor, field-programmable gate array (FPGA), application specific integrated circuit (ASIC), microcontroller, microprocessor, or the like. Computer system 400 is only one example of a suitable system and is not intended to suggest any limitation as to the scope of use or functionality of embodiments of the disclosure described herein. Computer system 400 can be implemented using hardware, software, and/or firmware. Regardless, processing system 400 is capable of being implemented and/or performing functionality as set forth in the disclosure.

Computer system 400 is shown in the form of a general-purpose computing device. Computer system 400 includes one or more processors 402, storage 404, an input/output (I/O) interface (I/F) 406 that can communicate with an internal component, such as a user interface 410, and optionally an external component 408.

The processor(s) 402 can include, for example, a single core or multicore processor, a programmable logic device (PLD), microprocessor, a digital signal processor (DSP), a microcontroller, a field-programmable gate array (FPGA), an application-specific integrated circuit (ASIC), and/or other discrete or integrated logic circuitry having similar processing capabilities.

The processor(s) 402 and the storage 404 can be included in components provided in the FPGA, ASIC, microcontroller, or microprocessor, for example. Storage 404 can include, for example, volatile and non-volatile memory for storing data temporarily or long term, and for storing programmable instructions executable by the processor(s) 402. Storage 404 can be a removable (e.g., portable) memory for storage of program instructions, public keys (such as, with reference to FIG. 1, public key 122), unique and/or identification data (such as ID data 124) and an HMAC key (such as HMAC key 126). I/O I/F 406 can include an interface and/or conductors to couple to the one or more internal components and/or external components 408.

The program instructions include program modules for generally carrying out the functions and/or methodologies of embodiments of the disclosure as described herein (e.g., logic and functionality blocks (such as firmware logic 108, first functionality block 116, and second functionality block 118 that are provided in firmware shown in FIG. 1, by way of example, and not limitation), cryptographic functionality blocks (such as security token engine 110, HMAC engine 112, and device cryptographic engine 114 that are provided in hardware, firmware, software, or a combination thereof, shown in FIG. 1, by way of example, and not limitation). as well as an operating system, one or more application programs, other program modules, and program data. Each of the operating system, one or more application programs, other program modules, and program data or some combination thereof, may include an implementation of a networking environment. The computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagram and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process. The instructions when executed on the computer or other programmable apparatus provide processes for implementing the disclosed functions/acts, including those specified in the block diagram block or blocks.

Embodiments of the processing components of secure device 102 may be implemented or executed by one or more computer systems, such as a microprocessor. Each computer system 400 or multiple instances thereof can be included within secure device 102. The computer system 400 can be provided as an embedded device or include an embedded device.

Computer system 400 is only one example of a suitable system and is not intended to suggest any limitation as to the scope of use or functionality of embodiments of the disclosure described herein. Regardless, computer system 400 is capable of being implemented and/or performing any of the functionality set forth hereinabove.

Computer system 400 may be described in the general context of computer system-executable instructions, such as program modules, being executed by a computer system. Generally, program modules may include routines, programs, objects, components, logic, data structures, and so on that perform particular tasks or implement particular abstract data types.

The terms “comprises” or “comprising” are to be interpreted as specifying the presence of the stated features, integers, operations or components, but not precluding the presence of one or more other features, integers, operations or components or groups thereof.

Those having ordinary skill in the art understand that any numerical values disclosed herein can be exact values or can be values within a range. Further, any terms of approximation (e.g., “about”, “approximately”, “around”) used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles “a”, “an”, and “the” as used herein and in the appended claims are used herein to refer to one or to more than one (i.e., to at least one) of the grammatical object of the article unless the context clearly indicates otherwise. By way of example, “an element” means one element or more than one element.

The phrase “and/or,” as used herein in the specification and in the claims, should be understood to mean “either or both” of the elements so conjoined, i.e., elements that are conjunctively present in some cases and disjunctively present in other cases. Multiple elements listed with “and/or” should be construed in the same fashion, i.e., “one or more” of the elements so conjoined. Other elements may optionally be present other than the elements specifically identified by the “and/or” clause, whether related or unrelated to those elements specifically identified. Thus, as a non-limiting example, a reference to “A and/or B”, when used in conjunction with open-ended language such as “comprising” can refer, in one embodiment, to A only (optionally including elements other than B); in another embodiment, to B only (optionally including elements other than A); in yet another embodiment, to both A and B (optionally including other elements); etc.

As used herein in the specification and in the claims, “or” should be understood to have the same meaning as “and/or” as defined above. For example, when separating items in a list, “or” or “and/or” shall be interpreted as being inclusive, i.e., the inclusion of at least one, but also including more than one, of a number or list of elements, and, optionally, additional unlisted items. Only terms clearly indicated to the contrary, such as “only one of” or “exactly one of,” or, when used in the claims, “consisting of,” will refer to the inclusion of exactly one element of a number or list of elements. In general, the term “or” as used herein shall only be interpreted as indicating exclusive alternatives (i.e., “one or the other but not both”) when preceded by terms of exclusivity, such as “either,” “one of,” “only one of,” or “exactly one of.”

Potential advantages shown and described include the ability to allow an authorized party to unlock or obtain access to a special mode or otherwise locked functionality of a secure device, that is not available to unauthorized parties. The authorized party can be, for example, a merchant, manufacturer, leaser, etc. of the secure device, and the unauthorized parties can be for example a customer or potential customer. This locked functionality can provide the ability to perform, for example, technical analysis of a returned product, sensitive functions that should not be available to an unauthorized party, etc. In other embodiments, the locked functionality can simply be normal functionality of the secure device, such that the secure device cannot function normally when the locked functionality remains locked. This access to the locked functionality is provided while maintaining a high degree of cyber security by eliminating the need to store hard-coded credentials and eliminating the need to reuse an unlocking key that could be discovered by an authorized party.

The techniques described herein are exemplary, and should not be construed as implying any particular limitation of the certain illustrated embodiments. It should be understood that various alternatives, combinations, and modifications could be devised by those skilled in the art. For example, operations associated with the processes described herein can be performed in any order, unless otherwise specified or dictated by the operations themselves. The present disclosure is intended to embrace all such alternatives, modifications and variances that fall within the scope of the appended claims.

The terms “comprises” or “comprising” are to be interpreted as specifying the presence of the stated features, integers, operations or components, but not precluding the presence of one or more other features, integers, operations or components or groups thereof.

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

The various embodiments disclosed herein may be implemented as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a “circuit,” “module” or “system.” Furthermore, aspects may take the form of a computer program product embodied in one or more computer-readable medium(s) having computer-readable program code embodied thereon.

Any combination of one or more computer-readable medium(s) may be utilized. The computer-readable medium may be a non-transitory computer-readable medium. A non-transitory computer-readable medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer-readable medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. Moreover, such computer program code can execute using a single computer system or by multiple computer systems communicating with one another (e.g., using a local area network (LAN), wide area network (WAN), the Internet, etc.).

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

We claim:

1. A method for temporarily enabling functionality of a secure device comprising:

storing public keys for respective trusted devices of at least one trusted device;

storing device-unique data that is unique for the secure device;

generating a unique hashed-based message authentication code (HMAC) key;

computing, by the secure device and based on the HMAC key and the device-unique data, a unique HMAC;

transmitting the unique HMAC to a trusted device of the at least one trusted device;

receiving a signed HMAC from the trusted device, wherein the signed HMAC is the unique HMAC as signed by the trusted device using a private key of the trusted device such that a signature used to sign the unique HMAC is only available to be generated by the trusted device;

decrypting the signed HMAC using the public key for the trusted device;

recomputing, by the secure device, the unique HMAC based on the HMAC key and the device-unique data;

verifying that the signed HMAC received from the trusted device corresponds to the unique HMAC transmitted to the trusted device by comparing the decrypted signed HMAC to the unique HMAC to determine that the signed HMAC includes the unique HMAC previously computed based on the unique HMAC key and the device-unique data; and enabling functionality of the secure device based on a result of the comparison.

2. The method of claim 1, wherein the method further comprises:

storing the unique HMAC after the unique HMAC is computed; and retrieving the unique HMAC before the unique HMAC is compared.

3. The method of claim 2, wherein the HMAC key disappears for the secure device after being generated and used for computing the unique HMAC.

4. The method of claim 1, wherein the method further comprises:

storing the HMAC key after the unique HMAC is generated.

5. The method of claim 1, wherein the unique HMAC disappears for the secure device after being computed the first time and transmitted and after being computed the second time and compared.

6. The method of claim 1, wherein the functionality is enabled temporarily and expires based on an enablement condition.

7. The method of claim 6, wherein the enablement condition is a function of at least one of a receipt of a predetermined number of enablement requests to enable the functionality of the secure device, a predetermined number of power cycles of the secure device, a predetermined number of times the functionality is enabled or used, and a predetermined number of times of receiving the signed HMAC from the at least one trusted device.

8. The method of claim 6, wherein the enablement condition is configurable.

9. The method of claim 1, the method further comprising:

deleting the HMAC key responsive to an HMAC key expiration condition; and generating a new unique HMAC key.

10. The method of claim 9, wherein the expiration condition is a function of a predetermined time period, receipt of a predetermined number of enablement requests to enable the functionality of the secure device, a predetermined number of power cycles of the secure device, a predetermined number of times the functionality is enabled or used, and/or a predetermined number of times of receiving the signed HMAC from the at least one trusted device.

11. The method of claim 1, wherein before enabling the functionality, the secure device operates with a first level of functionality, and after enabling the functionality, the secure device operates with a second level of functionality that is different from the first level of functionality.

12. The method of claim 11, wherein the second level of functionality provides additional or fewer functions relative to the first level of functionality, and only one of the first and second levels of functionality allows the secure device to perform one or more of diagnostics associated with the secure device, in-depth troubleshooting associated with the secure device, in-depth testing of the secure device, changing protected settings of the secure device, recovering the secure device from a reduced state of functionality to a normal state of functionality, performing a firmware downgrade or upgrade, and restoring the secure device from a disabled state to an enabled state.

13. The method of claim 1, wherein the device-unique data is programmed or set in the secure device when the secure device is manufactured and is stored by the secure device in a trusted non-volatile location.

14. The method of claim 1, wherein neither a public key nor a private key for the secure device is used by either the secure device or the trusted device to enable functionality of the secure device.

15. The method of claim 1, wherein communications between the trusted device and the secure device during the method for temporarily enabling functionality of the secure device only include transmitting at least one unique HMAC from the secure device to the trusted device and transmitting at least one signed HMAC from the trusted device to the secure device.

16. A secure device comprising:

a memory configured to store a plurality of programmable instructions; and at least one processing device in communication with the memory, wherein the at least one processing device, upon execution of the plurality of programmable instructions is configured to:

store public keys for respective trusted devices of at least one trusted device;

store device-unique data that is unique for a secure device;

generate a unique hashed-based message authentication code (HMAC) key;

compute, by the processing device of the secure device based on the HMAC key and the device-unique data, a unique HMAC;

transmit the unique HMAC to a trusted device of the at least one trusted device;

receive a signed HMAC from the trusted device, wherein the signed HMAC is the unique HMAC as signed by the trusted device using a private key of the trusted device;

decrypt the signed HMAC using the public key for the trusted device;

recompute, by the processing device of the secure device, the unique HMAC based on the HMAC key and the device-unique data;

verify that the signed HMAC corresponds to the unique HMAC transmitted to the trusted device by the processing device by comparing the decrypted signed HMAC to the recomputed unique HMAC to determine that the signed HMAC includes the unique HMAC previously computed by the processing device based on the unique HMAC key and the device-unique data; and enable functionality of the secure device based on a result of the comparison.

17. The secure device of claim 16, wherein the functionality is enabled temporarily and expires based on an enablement condition that is a function of at least one of a predetermined number of power cycles of the secure device and a predetermined number of times the functionality is enabled or used.

18. The secure device of claim 16, wherein the at least one processing device, upon execution of the plurality of programmable instructions, is further configured to:

delete the HMAC key responsive to an HMAC key expiration condition; and generate a new unique HMAC key.

19. A non-transitory computer readable storage medium and one or more computer programs stored therein, the computer programs comprising instructions, which when executed by a computer system, cause the computer system to:

store public keys for respective trusted devices of at least one trusted device;

store device-unique data that is unique for a secure device;

generate a unique hashed-based message authentication code (HMAC) key;

compute, by the computer system and based on the HMAC key and the device-unique data, a unique HMAC;

transmit the unique HMAC to a trusted device of the at least one trusted device;

receive a signed HMAC from the trusted device, wherein the signed HMAC is the unique HMAC as signed by the trusted device using a private key of the trusted device;

decrypt the signed HMAC using the public key for the trusted device;

recompute, by the computer system, the unique HMAC based on the HMAC key and the device-unique data;

verify that the signed HMAC corresponds to the unique HMAC by comparing the decrypted signed HMAC to the unique HMAC to determine whether the decrypted signed HMAC includes the unique HMAC previously computed by the computer system based on the unique HMAC key and the device-unique data; and enable functionality of the secure device based on a result of the comparison.

20. The non-transitory computer readable storage medium of claim 19, wherein the functionality enabled based on a result of the comparison is enabled temporarily and expires based on an enablement condition that is a function of at least one of a predetermined number of power cycles of the secure and a predetermined number of times the functionality is enabled or used.

* * * * *